United States Patent
Shanmuga Vadivel et al.

(10) Patent No.: US 12,272,021 B2
(45) Date of Patent: *Apr. 8, 2025

(54) DATA PRE-PROCESSING FOR LOW-LIGHT IMAGES

(71) Applicant: Synaptics Incorporated, San Jose, CA (US)

(72) Inventors: Karthikeyan Shanmuga Vadivel, San Jose, CA (US); Omar Oreifej, Los Angeles, CA (US); Patrick A. Worfolk, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,582

(22) Filed: Mar. 18, 2024

(65) Prior Publication Data
US 2024/0257303 A1    Aug. 1, 2024

Related U.S. Application Data

(63) Continuation of application No. 17/317,227, filed on May 11, 2021, now Pat. No. 11,967,042.

(51) Int. Cl.
*G06T 5/00* (2024.01)
*G06T 3/4046* (2024.01)
(Continued)

(52) U.S. Cl.
CPC .............. *G06T 3/4046* (2013.01); *G06T 5/70* (2024.01); *G06T 7/90* (2017.01)

(58) Field of Classification Search
CPC ...... G06T 5/00–40; G06T 3/4046; G06T 7/90
See application file for complete search history.

(56) References Cited

U.S. PATENT DOCUMENTS 6,285,798 B1 * 9/2001 Lee ........................... G06T 5/75
    382/266
6,717,698 B1 * 4/2004 Lee ...................... H04N 1/6027
    358/1.9

(Continued)

OTHER PUBLICATIONS

Brownlee et al., "How to Use Data Scaling to Improve Data Scaling Improve Deep Learning Model Stability and Performance," Aug. 25, 2020, machinelearningmaster.com.

(Continued)

*Primary Examiner* — Sean T Motsinger
(74) *Attorney, Agent, or Firm* — Paradice & Li LLP

(57) ABSTRACT

This disclosure provides methods, devices, and systems for low-light imaging. In some implementations, an image processor may be configured to reduce or remove noise associated with an image based, at least in part, on a neural network. For example, the neural network may be trained to infer a denoised representation of the image. In some aspects, the image processor may scale the brightness level of the image to fall within a normalized range of values associated with the neural network. In some other aspects, a machine learning system may scale the brightness levels of input images to match the brightness levels of ground truth images used to train the neural network. Still further, in some aspects, the machine learning system may scale the brightness levels of the input images and the brightness levels of the ground truth images to fall within the normalized range of values during training.

20 Claims, 10 Drawing Sheets

(51) Int. Cl.
    *G06T 5/70*           (2024.01)
    *G06T 7/90*           (2017.01)

(56) References Cited

U.S. PATENT DOCUMENTS

| | | | | |
|---|---|---|---|---|
| 11,468,543 | B1* | 10/2022 | Wang | G06T 5/90 |
| 2004/0081369 | A1* | 4/2004 | Gindele | G06T 5/40 |
| | | | | 382/274 |
| 2005/0201611 | A1* | 9/2005 | Lloyd, Jr. | F01D 5/141 |
| | | | | 382/152 |
| 2006/0147101 | A1* | 7/2006 | Zhang | G06T 5/70 |
| | | | | 382/131 |
| 2007/0047834 | A1* | 3/2007 | Connell | G06T 5/70 |
| | | | | 382/274 |
| 2009/0304274 | A1* | 12/2009 | Yoshii | H04N 9/69 |
| | | | | 348/739 |
| 2015/0347858 | A1* | 12/2015 | Johnson | G06F 3/04845 |
| | | | | 382/311 |
| 2018/0040111 | A1* | 2/2018 | Benet Ballester | G06T 7/254 |
| 2021/0150812 | A1* | 5/2021 | Su | G06N 3/045 |
| 2022/0058782 | A1* | 2/2022 | Amthor | G06T 5/92 |
| 2022/0211258 | A1* | 7/2022 | Westwick | A61B 1/0005 |
| 2022/0284553 | A1* | 9/2022 | Hwang | G06T 5/00 |
| 2022/0292640 | A1* | 9/2022 | Kokura | G06V 10/82 |
| 2022/0366532 | A1* | 11/2022 | Shanmuga Vadivel | G06T 5/90 |
| 2023/0007835 | A1* | 1/2023 | Ratcliffe | G06T 5/50 |

OTHER PUBLICATIONS

Chen et al., "Learning to See in the Dark," arXiv:1805.01934v1 [cs.CV], pp. 1-10, May 4, 2018.

* cited by examiner

FIG. 7A

700 — Array with cells labeled $T_{i,j}$ / $BL_T$ for $i=1..n$, $j=1..m$

FIG. 7B

710 — Array with cells labeled $GT_{i,j}$ / $BL_{GT}$ for $i=1..n$, $j=1..m$

DATA PRE-PROCESSING FOR LOW-LIGHT IMAGES

CROSS REFERENCE TO RELATED APPLICATIONS

This application is a continuation of U.S. patent application Ser. No. 17/317,227 filed May 11, 2021, entitled "DATA PRE-PROCESSING FOR LOW-LIGHT IMAGES," which is assigned to the assignee hereof. The disclosure of the prior application is considered part of and is incorporated by reference in this patent application.

TECHNICAL FIELD

The present implementations relate generally to image processing, and specifically to data pre-processing for low-light images.

BACKGROUND OF RELATED ART

Images captured of a scene in low light conditions (also referred to as "low-light images") may exhibit poor contrast and significant noise (or color distortion) due to low photon count incident on the photosensors of the image capture device (such as a camera). Example techniques for improving low-light image quality include, but are not limited to, increasing the amount of illumination (or illuminance) in the scene, increasing the exposure duration or aperture size, and increasing the gain (or sensitivity) of the photosensors. Although each of these techniques may produce a brighter overall image, the resulting image may not accurately capture the scene as intended. For example, increasing the illuminance requires altering the scene itself, which often may not be practical. On the other hand, increasing the exposure time can result in visual artifacts such as motion blur. Further, increasing the gain of the photosensors also may amplify the noise in the image.

Image processing enables a captured image to be rendered on a display such that the original scene can be reproduced as accurately as possible given the capabilities or limitations of the image capture device. For example, an image processor may adjust the pixel values for images that are captured under low light conditions to correct for inaccuracies in brightness, color, and noise. Existing image processing techniques apply algorithmic filters to determine the adjusted pixel values. Algorithmic filters depend on careful parameter selection, which limits the optimal effectiveness of image processing to a narrow range of image capture conditions. For example, algorithmic filters may not be suitable for image processing of short-exposure images captured in extremely low light conditions.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of denoising images. The method includes steps of receiving a plurality of first pixel values representing an image; determining a first range of values associated with the plurality of first pixel values; determining a first scaling factor associated with a $k^{th}$ quantile of the first range of values; performing a first scaling operation on the plurality of first pixel values that produces a respective plurality of second pixel values based on the first scaling factor; and providing the plurality of second pixel values as inputs to a neural network that reduces noise associated with the image based on the plurality of second pixel values.

Another innovative aspect of the subject matter of this disclosure can be implemented in an image processor including a processing system and a memory. The memory stores instructions that, when executed by the processing system, causes the image processor to receive a plurality of first pixel values representing an image; determine a first range of values associated with the plurality of first pixel values; determine a first scaling factor associated with a $k^{th}$ quantile of the first range of values; perform a first scaling operation on the plurality of first pixel values that produces a respective plurality of second pixel values based on the first scaling factor; and provide the plurality of second pixel values as inputs to a neural network that reduces noise associated with the image based on the plurality of second pixel values.

Another innovative aspect of the subject matter of this disclosure can be implemented in a method of training neural networks. The method includes steps of receiving a plurality of first pixel values representing an input image having a first brightness level and a first amount of noise; receiving a plurality of second pixel values representing a ground truth image having a second brightness level and a second amount of noise that is less than the first amount; determining a range of values associated with the plurality of second pixel values; determining a first scaling factor associated with a $k^{th}$ quantile of the range of values; performing a first scaling operation on the plurality of first pixel values that produces a respective plurality of third pixel values based on the first scaling factor; performing a second scaling operation on the plurality of second pixel values that produces a respective plurality of fourth pixel values based on the first scaling factor; and training the neural network to reproduce the plurality of fourth pixel values based at least in part on the plurality of third pixel values.

BRIEF DESCRIPTION OF THE DRAWINGS

The present embodiments are illustrated by way of example and are not intended to be limited by the figures of the accompanying drawings.

FIG. 7A shows an example input image usable for training a neural network.

FIG. 7B shows an example ground truth image usable for training a neural network.

DETAILED DESCRIPTION

Figure 1:
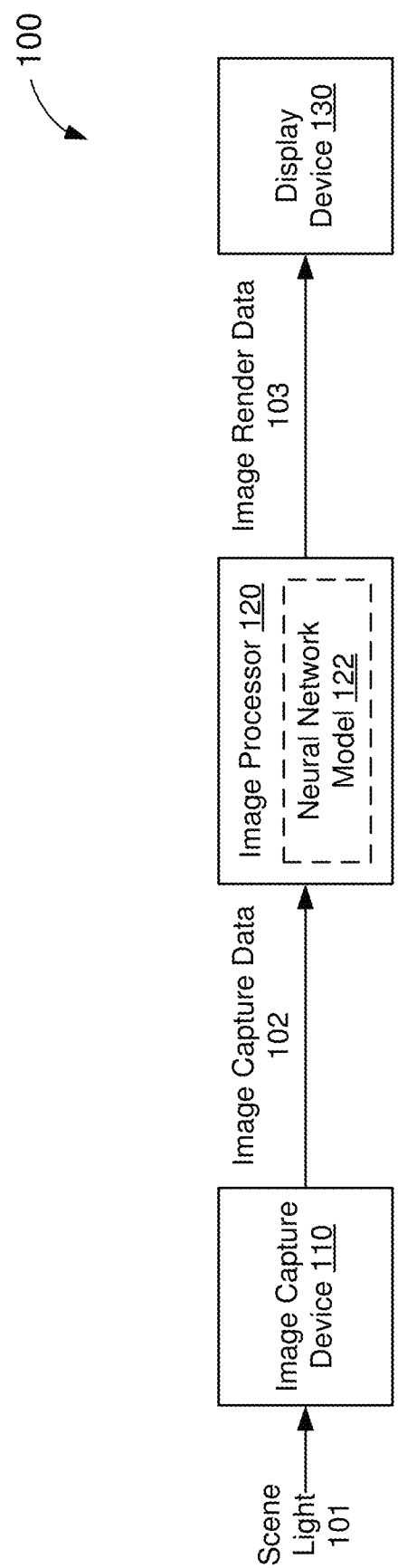
FIG. 1 shows a block diagram of an example image capture and display system, according to some implementations.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

Various implementations relate generally to low-light imaging. Some implementations more specifically relate to pre-processing low-light images for denoising by an image processor. In some implementations, the image processor may be configured to reduce or remove noise associated with an image captured under low light conditions (also referred to as a "low-light image") based, at least in part, on a neural network. For example, the neural network may be trained to infer a denoised representation of the low-light image. During training, the neural network may compare short-exposure images of a scene captured in low light conditions (also referred to as "input images") with representative images of the same scene that contain little or no noise (also referred to as "ground truth images"). More specifically, the neural network may learn a set of rules that can be used to reproduce the ground truth images from the input images.

Aspects of the present disclosure recognize that the ground truth images may have different exposure, gain, or illuminance values (collectively referred to as a "brightness level") than the input images. In some implementations, a machine learning system may scale the brightness levels of the input images to match the brightness levels of the ground truth images prior to providing the images as inputs to the neural network. In some other implementations, a machine learning system may scale the brightness levels of the input images and the brightness levels of the ground truth images to fall within a normalized range of values prior to providing the images as inputs to the neural network. Still further, in some implementations, an image processor may scale the brightness levels of low-light images to fall within the normalized range of values prior to denoising.

Particular implementations of the subject matter described in this disclosure can be implemented to realize one or more of the following potential advantages. By using neural networks, the image processor of the present implementations can perform denoising operations in a manner that is less computationally intensive compared to existing denoising algorithms. Because neural networks can be trained using images associated with a wide range of image capture conditions, the image processor may be capable of denoising images captured in extremely low light. In some implementations, the image pre-processor may simplify the operation of the neural network. As described above, different images often have different brightness levels. Training a neural network using images with different brightness levels may cause the neural network to adjust the brightness of input images. However, by scaling the brightness levels of input images, ground truth images, and low-light images to a normalized range of values, the neural networks of the present implementations can be trained to perform a pure denoising operation.

FIG. 1 shows a block diagram of an example image capture and display system 100, according to some implementations. The system 100 includes an image capture device 110, an image processor 120, and display device 130. The image capture device 110 (such as a camera) captures a pattern of light 101 from a scene and converts the light 101 to digital image capture data 102. The image capture data 102 may include an array of pixels (or pixel values) representing a digital image of the scene. The display device 130 (such as a television, computer monitor, smartphone, or any other device that includes an electronic display) renders or displays the digital image by reproducing the light pattern on an associated display surface.

The image processor 120 converts the image capture data 102 to image render data 103 that more accurately reflects the original scene captured by the image capture device 110. For example, the original scene may be more accurately reproduced on the display device 130 using the image render data 103 than the image capture data 102. In some implementations, the image processor 120 may be configured to correct various pixel distortions in the image capture data 102 to improve the quality of the digital image. Example pixel distortions include, but are not limited to, vignetting, aberration, and noise. Although depicted as an independent block in FIG. 1, in actual implementations the image processor 120 may be incorporated or otherwise included in the image capture device 110, the display device 130, or a combination thereof.

As described above, low-light images may exhibit poor contrast and significant noise (or color distortion) due to low photon count incident on the photosensors of the image capture device 110. Example techniques for improving low-light image quality include, but are not limited to, increasing the amount of illumination (or illuminance) in the scene, increasing the exposure duration or aperture size, and increasing the gain (or sensitivity) of the photosensors. Although each of these techniques may produce a brighter overall image, the resulting image may not accurately capture the scene as intended (or as perceived by the human eye). Moreover, such low-light image enhancement techniques may further introduce additional artifacts or noise into the captured image.

In some implementations, the image processor 120 may be configured to enhance low-light images in a manner that preserves the brightness levels of the original images while reducing the amount of noise associated therewith. For example, the image processor 120 may receive image capture data 102 representing a short-exposure image captured of a scene in low light conditions and may output image render data 103 that is a denoised representation of the original image (also referred to as a "denoised image"). In other words, the image processor 120 may perform a denoising operation on the image capture data 102 that filters or removes noise from the original image.

In some implementations, the image processor 120 may perform the denoising operation based on a neural network model 122 that is trained through machine learning. Machine learning is a technique for improving the ability of a computer system or application to perform a certain task. During a training phase, a machine learning system may be provided with multiple "answers" and one or more sets of raw data to be mapped to each answer. For example, a machine learning system may be trained to perform denoising operations on low-light images by providing the system with a large number of short-exposure images captured of a scene in low-light conditions (which represents the raw data) and one or more representative images of the same scene that contain little or no noise (which represents the answer).

The machine learning system may then analyze the raw data to "learn" a set of rules that can be used to reproduce the representative images from the low-light images. For example, the machine learning system may perform statistical analysis on the raw data to determine a common set of features (also referred to as "rules") that can be associated with noise. Deep learning is a particular form of machine learning in which the model being trained is a multi-layer neural network. Deep learning architectures are often referred to as artificial neural networks due to the way in which information is processed (similar to a biological nervous system).

For example, each layer of the deep learning architecture may be composed of a number of artificial neurons. The neurons may be interconnected across the various layers so that input data (or the raw data) may be passed from one layer to another. More specifically, each layer of neurons may perform a different type of transformation on the input data that will ultimately result in a desired output (such as a denoised image). The interconnected framework of neurons may be referred to as a neural network model. Thus, the neural network model 122 may include a set of rules that can be used to "infer" denoised representations of low-light images. As such, the image processor 120 may use the neural network model 122 to reduce noise associated with an image (or image capture data 102).

Figure 2:
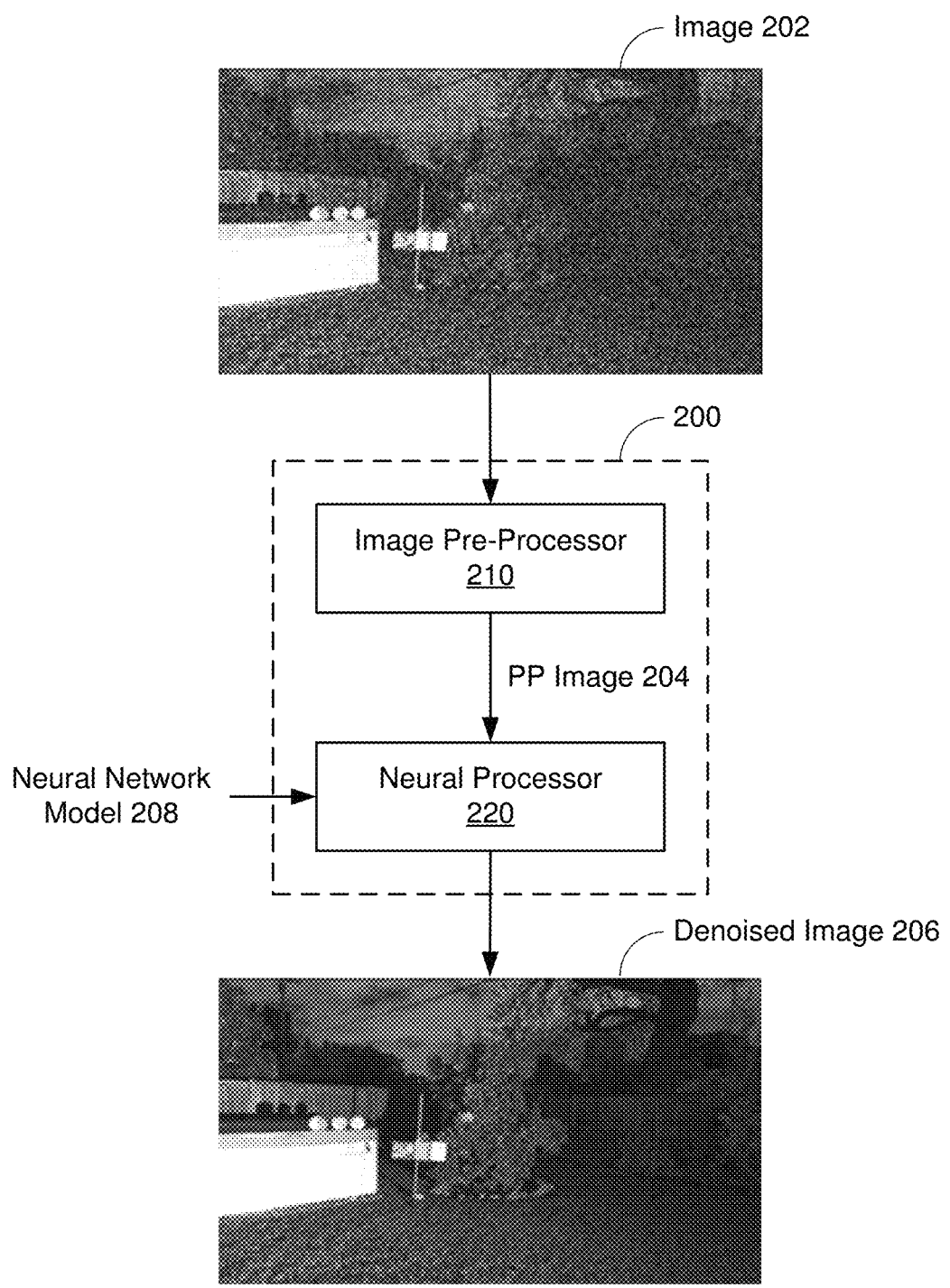
FIG. 2 shows a block diagram of an example image processor, according to some implementations.

FIG. 2 shows a block diagram of an example image processor 200, according to some implementations. In some implementations, the image processor 200 may be one example of image processor 120 of FIG. 1. Thus, the image processor 200 may be configured to receive an image 202 and output a denoised image 206. With reference for example to FIG. 1, the image 202 may be associated with the image capture data 102 and the denoised image 206 may be associated with the image render data 103.

In some implementations, the image processor 200 may generate the denoised image 206 by performing a denoising operation on the image 202 that reduces the amount of noise associated therewith. In the example of FIG. 2, the image 202 depicts a scene captured by an image capture device (such as the image capture device 110) in low-light conditions. As a result, the scene depicted in the image 202 appears noisy or grainy. For example, the distribution of pixels in the image 202 contains "spikes" in brightness and color (such as dark pixels in bright regions of the scene and bright pixels in dark regions of the scene). In contrast, the color and brightness of pixels in the denoised image 206 follow a substantially smooth distribution. For example, dark regions of the scene appear dark and bright regions of the scene appear bright in the denoised image 206.

In some implementations, the image processor 200 may include an image pre-processor 210 and a neural processor 220. The neural processor 220 may implement a neural network based on a neural network model 208. In some aspects, the neural processor 220 may include one or more processors that are configured to accelerate neural network inferencing. For example, the hardware architecture of the neural processor 220 may be designed to traverse neural networks more quickly or efficiently than a general-purpose processor. In some implementations, the neural network model 208 may be one example of the neural network model 122 of FIG. 1. Thus, the neural network model 208 may include a set of rules that can be used to infer a denoised representation of an image. As such, the neural processor 220 may infer the denoised image 206 based, at least in part, on the image 202.

Aspects of the present disclosure recognize that the brightness level of the image 202 can affect the inferencing (and training) of the neural network model 208. Moreover, different images may have different brightness levels. In some implementations, the neural network model 208 may be trained on a normalized set of raw data. For example, the raw data used in training the neural network model 208 may represent images having brightness levels (based on exposure, gain, and luminance values) that fall within a fixed range of values. In addition, the image pre-processor 210 may adjust the brightness level of the image 202 to fall within the normalized range of values associated with the neural network model 208. The image pre-processor 210 may output the adjusted image as a pre-processed (PP) image 204. Accordingly, the neural processor 220 may infer the denoised image 206 from the PP image 204 rather than the image 202 directly.

Figure 3:
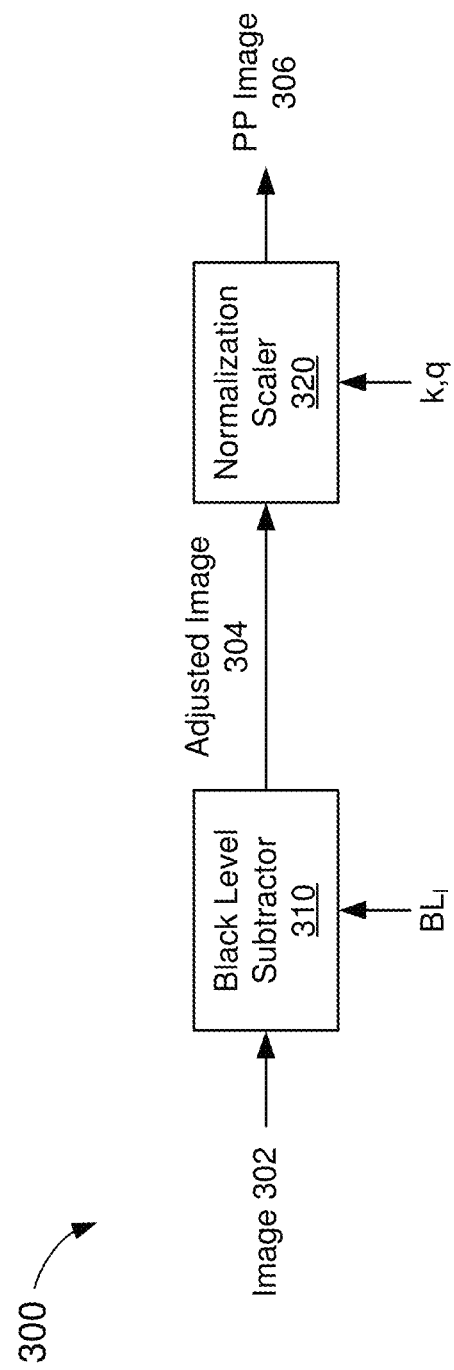
FIG. 3 shows a block diagram of an example image pre-processor for an image processing system, according to some implementations.

FIG. 3 shows a block diagram of an example image pre-processor 300 for an image processing system, according to some implementations. In some implementations, the image pre-processor 300 may be one example of the image pre-processor 210 of FIG. 2. Thus, the image pre-processor 300 may be configured to process an image 320 as an input suitable for inferencing via a neural network (such as the neural processor 220). For example, the image pre-processor 300 may generate a PP image 306 based on the image 302.

The image 302 may include a number (N) of pixels each having a value associated with a first range of pixel values. The first range of pixel values may depend on various factors including, but not limited to, exposure, gain, and dynamic range of the image capture device used to capture the image 302. For example, images captured with high dynamic range (HDR) may have a wider range of pixel values than images captured with standard dynamic range (SDR). The PP image 306 includes N pixels each having a value associated with a second range of pixel values. In some implementations, the second range of pixel values may be equal to a normalized range of values associated with the neural network. As used herein, the term "low-light image space" refers to an image space associated with the first range of pixel values and the term "normalized image space" refers to an image space associated with the second range of pixel values.

In some implementations, the image pre-processor 300 may include a black level subtractor 310 and a normalization scaler 320. The black level subtractor 310 subtracts a black level ($BL_I$) from the image 302 to produce an adjusted image 304. The black level BLI represents the darkest or lowest pixel value in the first range of pixel values (representing the low-light image space), such as when no light is incident on the photosensors. In some aspects, the image pre-processor 300 may determine the first range of pixel values (including the black level $BL_I$) based, at least in part, on a known configuration of the image capture device used to capture the image 302. The black level subtractor 310 may reduce the value of each pixel in the image 302 by the black level BLI amount so that the range of pixel values associated with the adjusted image 304 begins at or near zero. In other words, the pixel value for the darkest pixel in the adjusted image 304 may be substantially equal to zero.

The normalization scaler 320 performs a scaling operation on the adjusted image 304 to produce the PP image 306. In some implementations, the normalization scaler 320 may transfer or convert the adjusted image 304 to the normalized image space. In other words, the normalization scaler 320 may scale the pixel values of the adjusted image 304 to fall within the normalized range of values. For example, the normalization scaler 230 may divide the value of each pixel of the adjusted image 304 by a scaling factor (K) to obtain the value of a corresponding pixel of the PP image 306. In some aspects, the normalization scaler 320 may determine the scaling factor K based on a $k^{th}$ q-quantile of the first range of pixel values (representing the low-light image space). More specifically, the scaling factor K may represent the $k^{th}$ q-quantile of the first range of pixel values after subtracting the black level BLI. As such, the scaling factor K is not a fixed or predetermined value. Rather, the scaling factor K may vary based on the range of pixel values associated with the adjusted image 304.

For example, if the normalized image space is associated with a range of pixel values from 0 to 1, the scaling factor K may represent the $99^{th}$ percentile (k=99, q=100) of the first range of values. Thus, if the adjusted image 304 is associated with a range of pixel values from 0 to 100, the scaling factor K is equal to 99. As a result, the normalization scaler 320 may scale the maximum pixel value (100) of the adjusted image 304 down to the maximum pixel value (1) of the normalized image space. On the other hand, if the adjusted image 304 is associated with a range of pixel values from 0 to 1000, the scaling factor K is equal 990. Again, the normalization scaler 320 may scale the maximum pixel value (1000) of the adjusted image 304 down to the maximum pixel value (1) of the normalized image space.

In the example above, the scaling factor K is described as a $99^{th}$ percentile for illustrative purposes only. In actual implementations, the scaling factor K may represent a $k^{th}$ q-quantile for any suitable values of k and q. Example suitable quantiles may include, but are not limited to, quartiles (q=4), quintiles (q=5), sextiles (q=6), and the like. Moreover, k may be any value in the range of 1 to q−1. In some implementations, a similar scaling factor may be applied to the images used in training the neural network. For example, the inputs provided to a neural network during the training phase also may be normalized to the $k^{th}$ q-quantile. In such implementations, the values of k and q that define the scaling factor used in the training phase also may define the scaling factor used in the inferencing phase (such as implemented by the normalization scaler 230).

Figure 4:
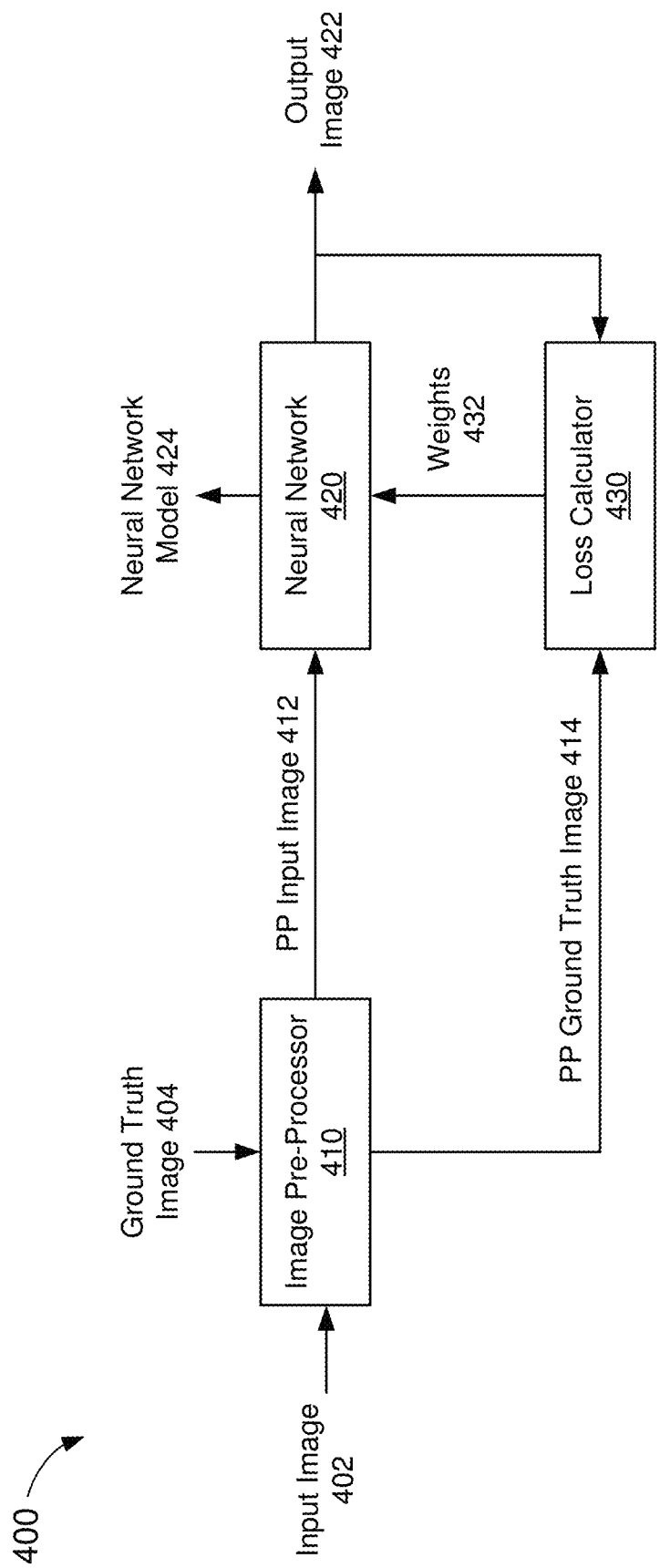
FIG. 4 shows a block diagram of an example machine learning system, according to some implementations.

FIG. 4 shows a block diagram of an example machine learning system 400, according to some implementations. The machine learning system 400 may be configured to generate a neural network model 424 based, at least in part, on an input image 402 and a ground truth image 404. In some implementations, the neural network model 424 may be one example of any of the neural network models 122 or 208 of FIGS. 1 and 2, respectively. Thus, the neural network model 424 may include a set of rules that can be used to infer a denoised representation of a low-light image (such as the image 202).

In some implementations, the machine learning system 400 may be trained to reproduce the ground truth image 404 based on the input image 402. As described above, training may be performed by providing the machine learning system 400 with an "answer" as well as raw data associated with the answer. In the example of FIG. 4, the ground truth image 404 represents the answer and the input image 402 represents the raw data associated with the answer. For example, the input image 402 may be a short-exposure image captured of a scene in low-light conditions. With reference for example to FIG. 2, the input image 402 may resemble the image 202. In contrast, the ground truth image 404 may be a representative image of the same scene with little or no noise. For example, the ground truth image 404 may be captured using longer exposure or higher gain settings than the input image 402. With reference for example to FIG. 2, the ground truth image 404 may resemble the denoised image 206.

In some implementations, the machine learning system 400 may include an image pre-processor 410, a neural network 420, and a loss calculator 430. The image-preprocessor 410 performs scaling operations on the input image 402 and the ground truth image 404 to produce a PP input image 412 and a PP ground truth image 414, respectively. In some implementations, the image pre-processor 410 may scale the brightness level of the input image 402 to match the brightness level of the ground truth image 404. This allows the neural network 420 to learn a set of rules that contribute only to denoising (without taking into account differences in brightness levels between the input image 402 and the ground truth image 404). In some other implementations, the image pre-processor 410 may scale the brightness levels of the input image 402 and the ground truth image 404 to fall within a desired range of values. This allows the neural network 420 to learn a set of rules that can be applied to a normalized set of input data.

The neural network 420 receives the PP input image 412 and attempts to recreate the PP ground truth image 414. For example, the neural network 420 may form a network of connections across multiple layers of artificial neurons that begin with the PP input image 412 and lead to an output image 422. The connections are weighted to result in an output image 422 that closely resembles the PP ground truth image 414. For example, the training operation may be performed over multiple iterations. In each iteration, the neural network 420 produces an output image 422 based on the weighted connections across the layers of artificial neurons, and the loss calculator 430 updates the weights 432 associated with the connections based on an amount of loss (or difference) between the output image 422 and the PP ground truth image 414. When the loss falls below a threshold level, the neural network 420 may output the weighted connections as the neural network model 424.

In some implementations, the neural network 420 may be trained to perform a pure denoising operation. As described above, in some aspects, the image pre-processor 410 may adjust the input image 402 so that the brightness level of the image does not factor into the training of the neural network 420. In some other aspects, the neural network 420 may be trained on raw image data so that no image signal processing (ISP) techniques factor into the training of the neural network 420. In other words, each of the images 402, 404, 412, 414, and 422 may represent raw image data. The raw image data reflects the manner in which an image capture device captures images using a color filter array (CFA). For example, a CFA (such as a Bayer filter) may be placed over an array of photosensors in the image capture device so that each photosensor is aligned with a respective color filter (such as red, green, or blue) of the CFA. As a result, each pixel value of the raw image data represents a brightness of a particular color (or wavelength) of light associated with the CFA.

Demosaicing is an ISP technique that interpolates the pixel values of the raw image data to reproduce the original gamut of colors from the scene. Aspects of the present disclosure recognize that demosaicing, as well as other ISP techniques, may be performed differently by different image processors. Moreover, any ISP performed on the input image 402 or the ground truth image 404 may affect the training (and inferencing) of the neural network model 424. Thus, by training the neural network 420 on raw image data, aspects of the present disclosure may produce a neural network model 424 that is agnostic to ISP. As a result, the neural network model 424 can be integrated with a wide range of image processors (and ISP techniques). Also, because the neural network 420 does not need to account for differences in ISP (or brightness levels) between the input image 402 and the ground truth image 404, the training operation may be performed faster and more efficiently, resulting in a neural network model 424 that is closely tailored (or optimized) for denoising.

Figure 5:
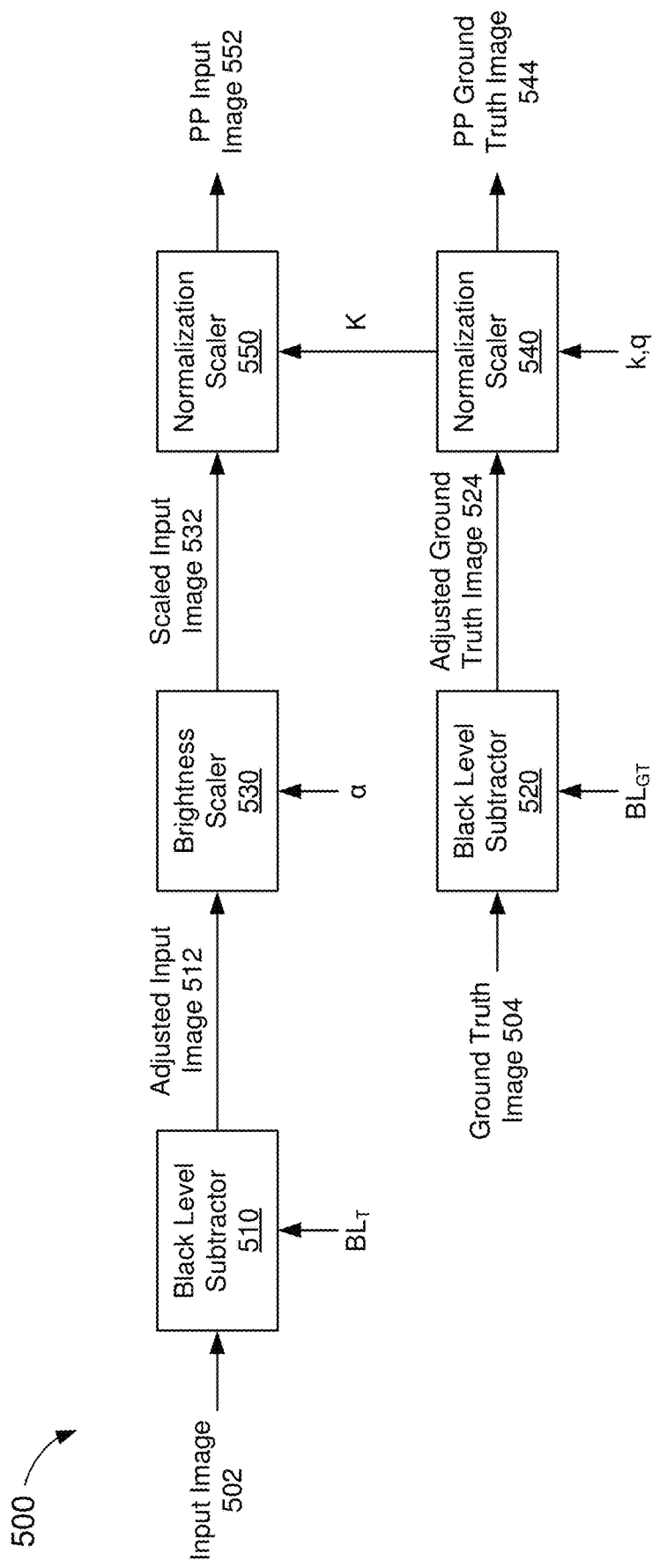
FIG. 5 shows a block diagram of an example image pre-processor for a machine learning system, according to some implementations.

FIG. 5 shows a block diagram of an example image pre-processor 500 for a machine learning system, according to some implementations. In some implementations, the image pre-processor 500 may be one example of the image pre-processor 410 of FIG. 4. Thus, the image pre-processor 500 may be configured to process an input image 502 and a ground truth image 504 as inputs suitable for training a neural network (such as the neural network 420). For example, the image pre-processor 500 may generate a PP input image 552 and a PP ground truth image 544 based on the input image 502 and the ground truth image 504, respectively.

The input image 502 may include a number (N) of pixels each having a value associated with a first range of pixel values; the ground truth image 504 may include N pixels each having a value associated with a second range of pixel values; the PP input image 552 may include N pixels each having a value associated with a third range of pixel values; and the PP ground truth image 544 may include N pixels each having a value associated with a fourth range of pixel values. In some implementations, each of the third and fourth ranges of pixel values may be equal to a normalized range of values associated with the neural network. As used herein, the term "input image space" refers to an image space associated with the first range of pixel values, the term "GT image space" refers to an image space associated with the second range of pixel values, and the term "normalized image space" refers to an image space associated with the third and fourth ranges of pixel values.

In some implementations, the image pre-processor 500 may include black level subtractors 510 and 520, a brightness scaler 530, and normalization scalers 540 and 550. The black level subtractor 510 subtracts a black level ($BL_T$) from the input image 502 to produce an adjusted input image 512. The black level $BL_T$ represents the darkest or lowest pixel value in the first range of pixel values (representing the input image space). In some aspects, the image pre-processor 500 may determine the first range of pixel values (including the black level $BL_T$) based, at least in part, on a known configuration of the image capture device used to capture the input image 502. The black level subtractor 510 may reduce the value of each pixel in the input image 502 by the black level $BL_T$ amount so that the range of pixel values associated with the adjusted input image 512 begins at or near zero. In other words, the pixel value for the darkest pixel in the adjusted input image 512 may be substantially equal to zero.

The black level subtractor 520 subtracts a black level ($BL_{GT}$) from the ground truth image 504 to produce an adjusted ground truth image 524. The black level $BL_{GT}$ represents the darkest or lowest pixel value in the second range of pixel values (representing the GT image space). In some aspects, the image pre-processor 500 may determine the second range of pixel values (including the black level $BL_{GT}$) based, at least in part, on a known configuration of the image capture device used to capture the ground truth image 504. The black level subtractor 520 may reduce the value of each pixel in the ground truth image 504 by the black level $BL_{GT}$ amount so that the range of pixel values associated with the adjusted ground truth image 524 begins at or near zero. In other words, the pixel value for the darkest pixel in the adjusted ground truth image 524 may be substantially equal to zero.

The brightness scaler 530 performs a scaling operation on the adjusted input image 512 to produce a scaled input image 532. In some implementations, the brightness scaler 530 may transfer or convert the adjusted input image 512 to the GT image space (after subtracting the black level $BL_{GT}$). In other words, the brightness scaler 530 may scale the brightness level of the adjusted input image 512 to match the brightness level of the adjusted ground truth image 524. For example, the brightness scaler 530 may multiply the value of each pixel of the adjusted input image 512 by a scaling factor ($\alpha$) to obtain the value of a corresponding pixel of the scaled input image 532. In some aspects, the brightness scaler 530 may determine the scaling factor $\alpha$ based on a ratio of the brightness level of the ground truth image 504 (including exposure ($E_{GT}$), gain ($G_{GT}$), and lux ($L_{GT}$) values) relative to the brightness level of the input image 502 (including exposure ($E_T$), gain ($G_T$), and lux ($L_T$) values):

$$\alpha = \frac{E_{GT} * G_{GT} * L_{GT}}{E_T * G_T * L_T}$$

The normalization scaler 540 performs a scaling operation on the adjusted ground truth image 524 to produce the PP ground truth image 544. In some implementations, the normalization scaler 540 may transfer or convert the adjusted ground truth image 524 to the normalized image space. In other words, the normalization scaler 540 may scale the pixel values of the adjusted ground truth image 524 to fall within the normalized range of values. For example, the normalization scaler 540 may divide the value of each pixel of the adjusted ground truth image 524 by a scaling factor K to obtain the value of a corresponding pixel of the PP ground truth image 544. In some aspects, the normalization scaler 540 may determine the scaling factor K based on a $k^{th}$ q-quantile of the second range of pixel values (representing the $G_T$ image space). More specifically, the scaling factor K may represent the $k^{th}$ q-quantile of the second range of pixel values after subtracting the black level $BL_{GT}$. Thus, the scaling factor K may vary based on the range of pixel values associated with the adjusted ground truth image 524.

The normalization scaler 550 performs a scaling operation on the adjusted input image 532 to produce the PP input image 552. In some implementations, the normalization scaler 550 may transfer or convert the adjusted input image 532 to the normalized image space. In other words, the normalization scaler 550 may scale the pixel values of the adjusted input image 532 to fall within the normalized range of values. For example, the normalization scaler 550 may divide the value of each pixel of the adjusted input image 532 by the scaling factor K to obtain the value of a corresponding pixel of the PP input image 552. In some implementations, the normalization scaler 550 may apply the same scaling factor K as the normalization scaler 540. In the example of FIG. 5, the normalization scaler 540 is shown to transfer or otherwise provide the scaling factor K to the normalization scaler 550. However, in some other implementations, the normalization scaler 550 may transfer or provide the scaling factor K to the normalization scaler 540.

As described above, the scaling factor $\alpha$ depends on the black level $BL_T$ and brightness level of the input image 502 as well as the black level $BL_{GT}$ and brightness level of the ground truth image 504. Because the ground truth image 504 is carefully tuned or selected to be a representative image, the black level $BL_{GT}$ and brightness level of the ground truth image 504 are generally known. However, because the neural network may be trained on a large volume of input images 502 that are intentionally different than one another, the black level $BL_T$ or brightness level of any particular input image 502 may not be known. Even in instances where the image pre-processor 500 is able to obtain known values for $E_T$, $G_T$, or $L_T$, such values may not accurately reflect the brightness level of the actual input image 502. In some implementations, the image pre-processor 500 may determine the scaling factor $\alpha$ and the black level $BL_T$ by comparing the pixel values of the input image 502 with the pixel values of the ground truth image 504.

Figure 6:
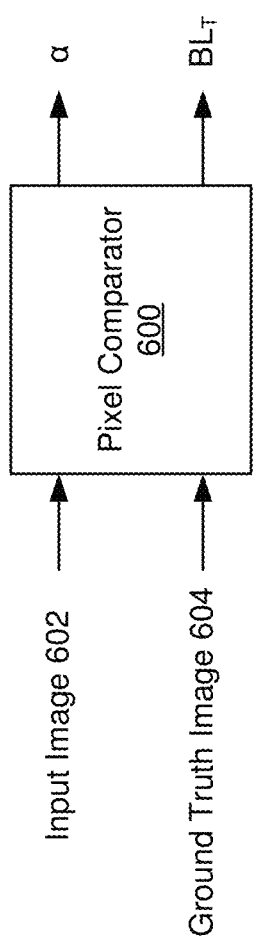
FIG. 6 shows a block diagram of an example pixel comparator, according to some implementations.

FIG. 6 shows a block diagram of an example pixel comparator 600, according to some implementations. In some implementations, the pixel comparator 600 may be implemented by an image pre-processor (such as the image pre-processor 500 of FIG. 5) to obtain a black level ($BL_T$) and scaling factor $\alpha$ that can be used to scale the brightness level of an input image 602 to match the brightness level of a ground truth image 604. More specifically, the pixel comparator 600 may compare pixels of the input image 602 with respective pixels of the ground truth image 604 to determine the scaling factor $\alpha$ and the black level $BL_T$.

FIG. 7A shows an example input image 700 usable for training a neural network model. In some implementations, the input image 700 may be one example of the input image 602 of FIG. 6. The input image 700 is depicted as an array of pixels elements arranged in a number (n) of rows and a number (m) of columns. The pixel element at the intersection of each row (x) and column (y) has a respective pixel value ($T_{x,y}$) and a black level $BL_T$. As described above, the black level $BL_T$ represents the darkest or lowest pixel value of the image space associated with the input image 700.

Subtracting the black level $BL_T$ from each pixel element $T_{x,y}$ results in a respective adjusted pixel value ($\overline{T}_{x,y}$).

FIG. 7B shows an example ground truth image 710 usable for training a neural network model. In some implementations, the ground truth image 710 may be one example of the ground truth image 604 of FIG. 6. The ground truth image 710 is also depicted as an array of pixel elements arranged in n rows and m columns. The pixel element at the intersection of each row (x) and column (y) has a respective pixel value ($GT_{x,y}$) and a black level $BL_{GT}$. As described above, the black level $BL_{GT}$ represents the darkest or lowest pixel value of the image space associated with the ground truth image 710. Subtracting the black level $BL_{GT}$ from each pixel element $T_{x,y}$ results in a respective adjusted pixel value ($\overline{GT}_{x,y}$).

Aspects of the present disclosure recognize that, because the input image 700 and the ground truth image 710 depict the same scene, each pixel element of the input image 700 maps to a respective pixel element of the ground truth image 710. More specifically, each pixel value of the input image 700 can be represented as a scalar multiple of a respective pixel value of the ground truth image 710 plus noise (N):

$$\overline{T}_{x,y} = \alpha(\overline{GT}_{x,y}) + N$$

The equation above can be expanded as:

$$T_{x,y} = \alpha(GT_{x,y} - BL_{GT}) + BL_T + N$$

As described above, the black level $BL_{GT}$ may be known. Thus, the pixel comparator 600 may use the pixel values $T_{x,y}$ and $GT_{x,y}$ associated with pixel elements of the input image 700 and ground truth image 710, respectively, to solve for the scaling factor α and the black level $BL_T$. For example, the pixel comparator 600 may determine values of α and $BL_T$ that minimize the least squares error between respective pairs of pixel values $T_{x,y}$ and $GT_{x,y}$.

In some implementations, the pixel comparator 600 may only use pixel values $T_{x,y}$ or $GT_{x,y}$ that fall within a given range of values in determining the values of a and $BL_T$. For example, aspects of the present disclosure recognize that pixel elements having the maximum pixel value associated with a given image space may be saturated, and that the value of a saturated pixel element may not be an accurate representation of the actual brightness of the scene. Thus, in some aspects, the pixel comparator 600 may exclude or ignore the maximum pixel value of the image space associated with the input image 700 as well as the maximum pixel value of the image space associated with the ground truth image 710.

Figure 8:
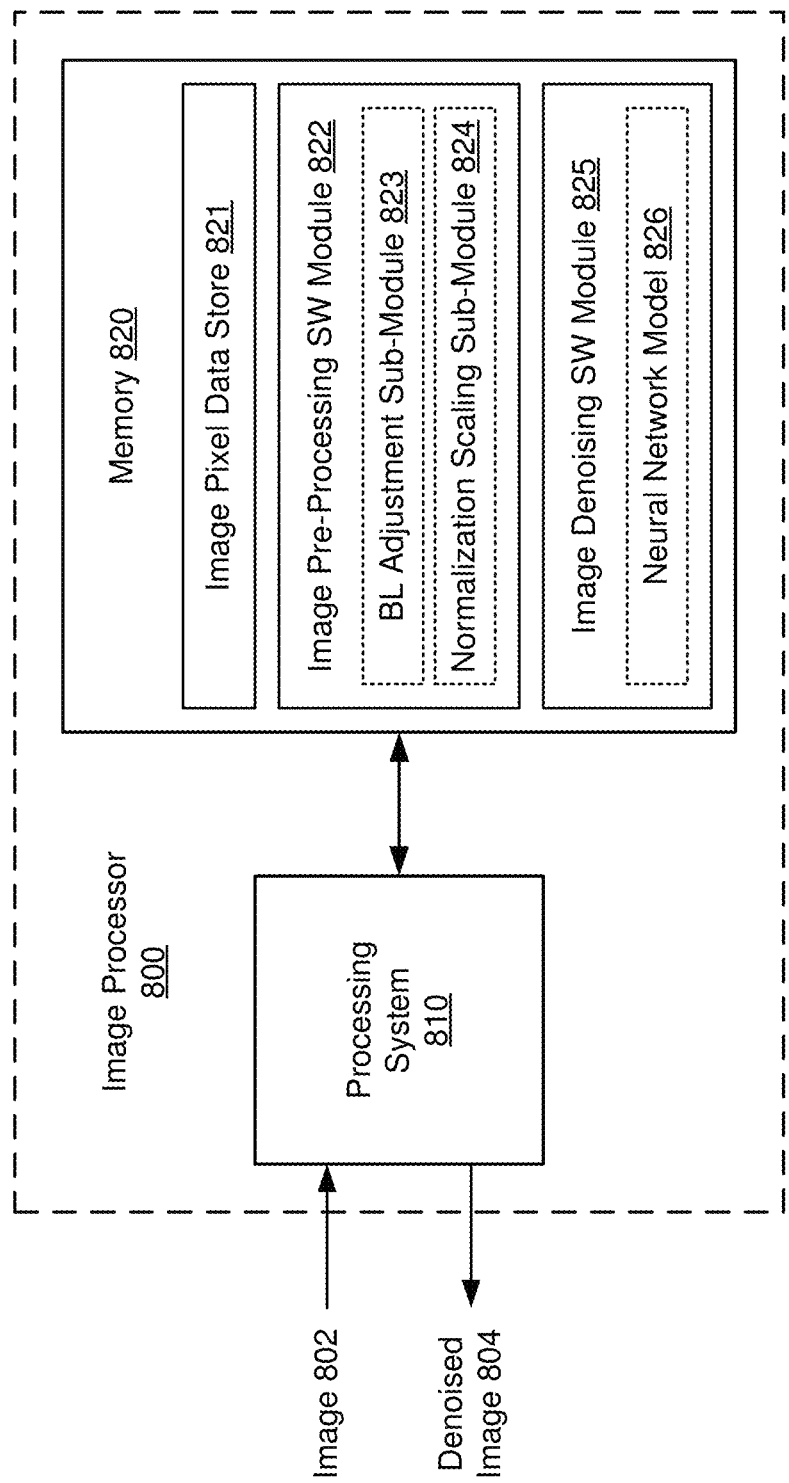
FIG. 8 shows an example image processor, according to some implementations.

FIG. 8 shows an example image processor 800, according to some implementations. In some implementations, the image processor 800 may be one example of the image processor 120 of FIG. 1. Thus, the image processor 800 may be configured to receive an image 802 and output a denoised image 804. With reference for example to FIG. 1, the image 802 may be associated with the image capture data 102 and the denoised image 804 may be associated with the image render data 103. In image processor 800 is shown to include a processing system 810 and a memory 820.

The memory 820 may include an image pixel data store 821 configured to store the image 802, the denoised image 804, or any intermediate image produced by the image processor 800. In some aspects, the image 802 may be a short-exposure image captured in low light conditions and the denoised image 804 may be a denoised representation of the image 802. The memory 820 also may include a non-transitory computer-readable medium (including one or more nonvolatile memory elements, such as EPROM, EEPROM, Flash memory, a hard drive, and the like) that may store at least the following software (SW) modules:

an image pre-processing SW module 822 to adjust the brightness level of the image 802 to fall within a normalized range of values associated with a neural network model 208, the image pre-processing SW module 822 further including:
  a black level (BL) adjustment sub-module 823 to subtract a black level from the image 802 so that the range of pixel values associated therewith begins at or near zero; and
  a normalization scaling sub-module 824 to perform a scaling operation on the image 802 so that each of the pixel values falls within the normalized range of values; and
an image denoising SW module 825 to perform a denoising operation on the image 802, based on the neural network model 208, that reduces the amount of noise associated therewith.

Each software module includes instructions that, when executed by the processing system 810, causes the image processor 800 to perform the corresponding functions.

The processing system 810 may include any suitable one or more processors capable of executing scripts or instructions of one or more software programs stored in the image processor 800 (such as in memory 820). For example, the processing system 810 may execute the image pre-processing SW module 822 to adjust the brightness level of the image 802 to fall within a normalized range of values associated with the neural network model 208. In executing the image pre-processing SW module 822, the processing system 810 may further execute the BL adjustment sub-module 823 or the normalization scaling sub-module 824.

The processing system 810 may execute the BL adjustment sub-module 823 to subtract a black level from the image 802 so that the range of pixel values associated therewith begins at or near zero. Further, the processing system 810 may execute the normalization scaling sub-module 824 to perform a scaling operation on the image 802 so that each of the pixel values falls within the normalized range of values. The processing system 810 also may execute the image denoising SW module 825 to perform a denoising operation on the image 802, based on the neural network model 208, that reduces the amount of noise associated therewith.

Figure 9:
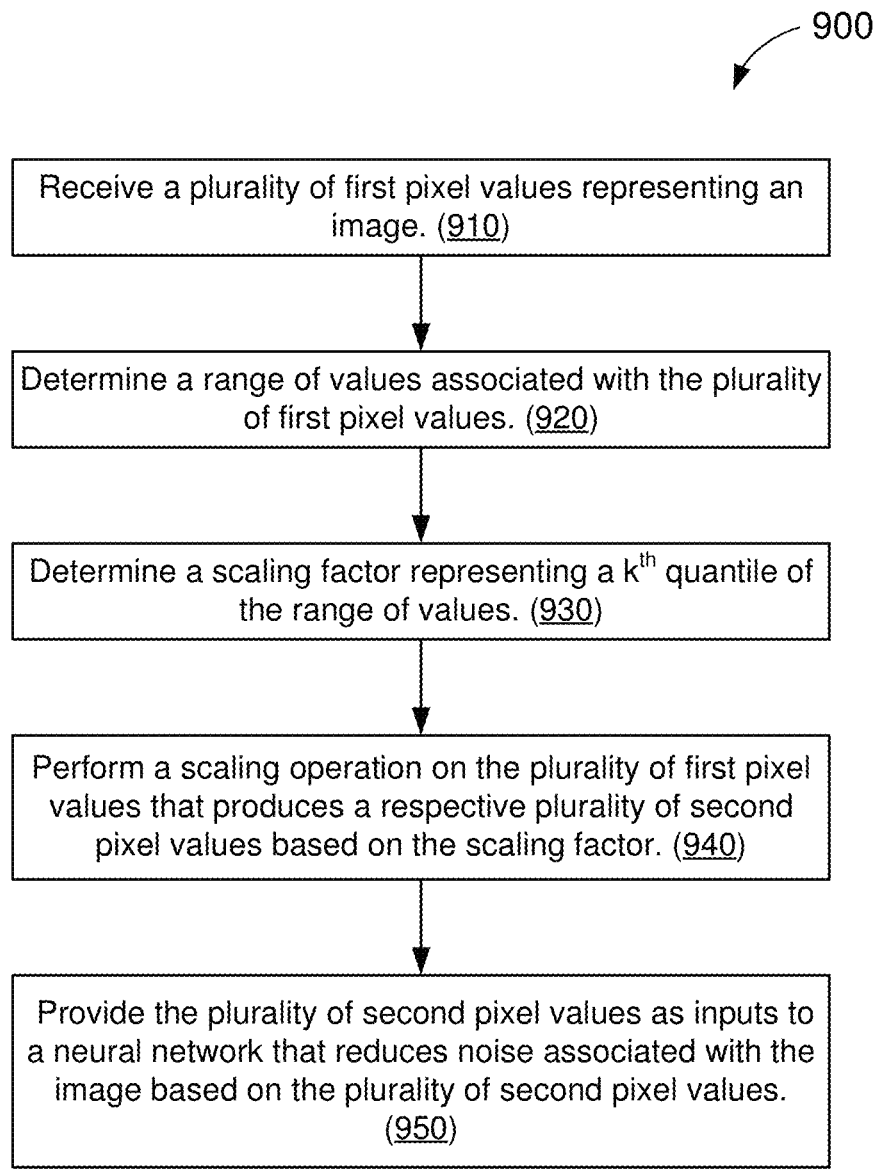
FIG. 9 shows an illustrative flowchart depicting an example operation for denoising images, according to some implementations.

FIG. 9 shows an illustrative flowchart depicting an example operation 900 for denoising images, according to some implementations. In some implementations, the example operation 900 may be performed by an image processor (such as the image processor 200 of FIG. 2) to reduce noise associated with images captured in low-light conditions.

The image processor receives a plurality of first pixel values representing an input image (910). In some aspects, the input image may depict a scene captured by an image capture device in low-light conditions. With reference for example to FIG. 2, the scene depicted in the input image (such as the input image 202) may appear noisy or grainy due to low photon count incident upon the photosensors in the image capture device.

The image processor determines a range of values associated with the plurality of first pixel values (920). The range of pixel values may depend on various factors including, but not limited to, exposure, gain, and dynamic range of the image capture device used to capture the input image. In some implementations, the image processor may determine the range of pixel values based, at least in part, on a known configuration of the image capture device.

The image processor determines a scaling factor representing a $k^{th}$ quantile of the range of values (930). As described with reference to FIG. 3, the scaling factor is not a fixed value. Rather, the scaling factor may vary based on the range of pixel values associated with the input image. In some implementations, the image processor may determine the scaling factor based, at least in part, on a normalized range of values associated with a neural network. For example, input data provided to the neural network during training also may be scaled to the $k^{th}$ quantile.

The image processor performs a scaling operation on the plurality of first pixel values that produces a respective plurality of second pixel values based on the scaling factor (940). For example, the image processor may divide each of the plurality of first pixel values by the scaling factor to obtain a respective one of the plurality of second pixel values. In some implementations, the image processor may subtract a black level from each of the plurality of first pixel values prior to performing the scaling operation.

The image processor provides the plurality of second pixel values as inputs to a neural network that reduces noise associated with the input image based on the plurality of second pixel values (950). For example, the neural network may be trained to infer a denoised representation of the input image. With reference for example to FIG. 2, the denoised image (such as the denoised image 206) appears substantially less noisy or grainy compared to the input image (such as the input image 202).

Figure 10:
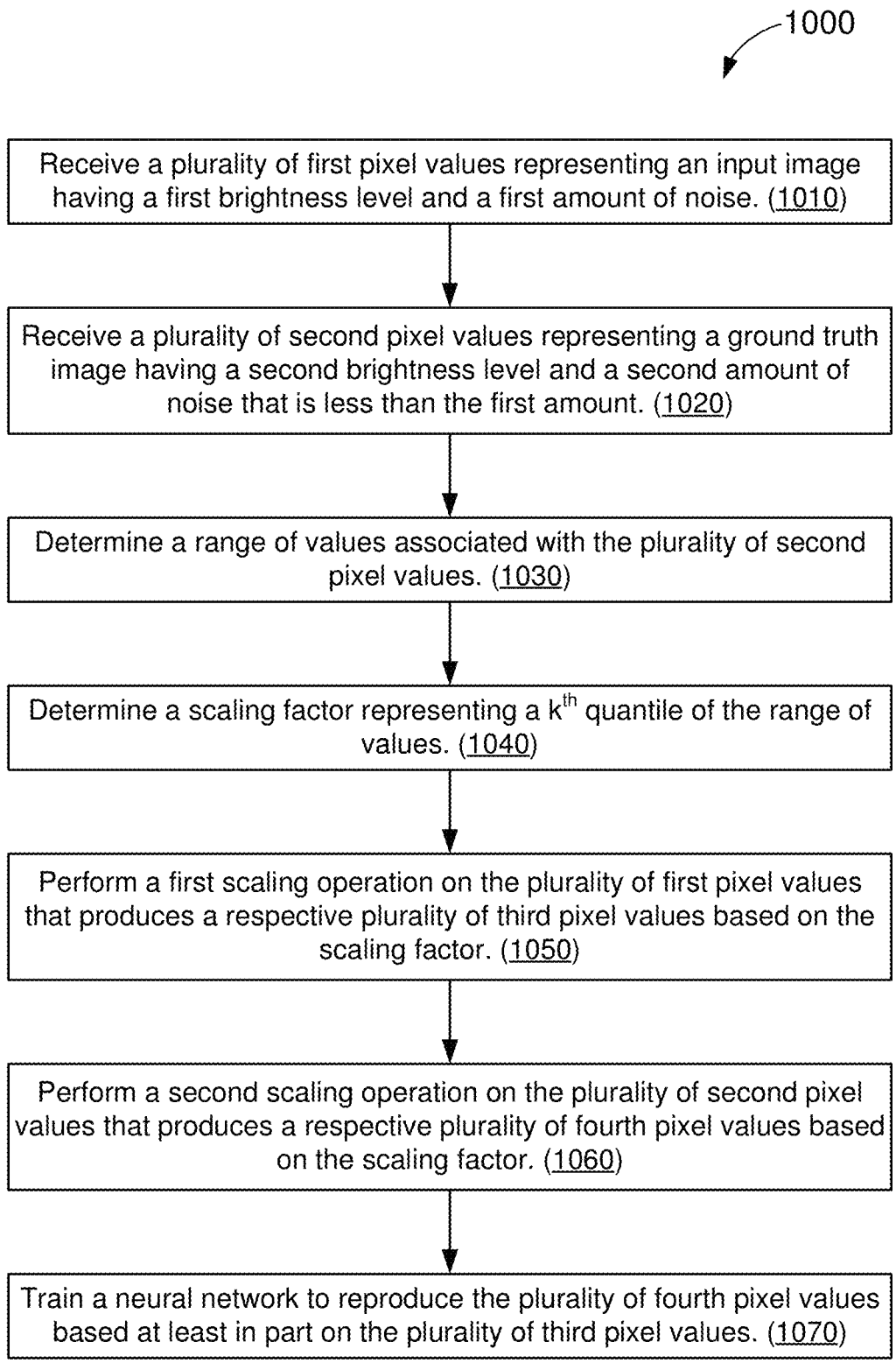
FIG. 10 shows an illustrative flowchart depicting an example operation for training neural networks, according to some implementations.

FIG. 10 shows an illustrative flowchart depicting an example operation 1000 for training neural networks, according to some implementations. In some implementations, the example operation 1000 may be performed by a machine learning system (such as the machine learning system 400 of FIG. 4) to produce a neural network model that can be used to infer a denoised representation of an input image.

The machine learning system receives a plurality of first pixel values representing an input image having a first brightness level and a first amount of noise (1010). In some aspects, the input image may be a short-exposure image captured of a scene in low-light conditions. Thus, the input image may contain a substantial amount of noise. With reference for example to FIG. 2, the input image may resemble the input image 202.

The machine learning system receives a plurality of second pixel values representing a ground truth image having a second brightness level and a second amount of noise that is less than the first amount (1020). In some aspects, the ground truth image may be a representative image of the scene that contains little or no noise. For example, the ground truth image may be captured using longer exposure or higher gain settings than the input image. With reference for example to FIG. 2, the ground truth image may resemble the denoised image 206.

The machine learning system determines a range of values associated with the plurality second pixel values (1030). The range of pixel values may depend on various factors including, but not limited to, exposure, gain, and dynamic range of the image capture device used to capture the ground truth image. In some implementations, the machine learning system may determine the range of pixel values based, at least in part, on a known configuration of the image capture device used to capture the ground truth image.

The machine learning system determines a scaling factor representing a $k^{th}$ quantile of the range of values (1040). As described with reference to FIG. 3, the scaling factor is not a fixed value. Rather, the scaling factor may vary based on the range of pixel values associated with the ground truth image. In some implementations, the machine learning system may determine the scaling factor based, at least in part, on a desired (or normalized) range of values to limit inputs to a neural network.

The machine learning system performs a first scaling operation on the plurality of first pixel values that produces a respective plurality of third pixel values based on the scaling factor (1050). For example, the machine learning system may divide each of the plurality of first pixel values by the scaling factor to obtain a respective one of the plurality of third pixel values. In some implementations, the machine learning system may subtract a black level from each of the plurality of first pixel values prior to performing the first scaling operation.

In some other implementations, the machine learning system may scale a brightness level of the plurality of first pixel values to match a brightness level of the plurality of second pixel values. In some aspects, the machine learning system may determine the brightness levels based, at least in part, on known configurations of the image capture devices used to capture the images. In some other aspects, the machine learning system may determine the brightness levels based, at least in part, on the plurality of first pixel values and the plurality of second pixel values.

The machine learning system performs a second scaling operation on the plurality of second pixel values that produces a respective plurality of fourth pixel values based on the scaling factor (1060). For example, the machine learning system may divide each of the plurality of second pixel values by the scaling factor to obtain a respective one of the plurality of fourth pixel values. In some implementations, the machine learning system may subtract a black level from each of the plurality of second pixel values prior to performing the second scaling operation.

The machine learning system trains a neural network to reproduce the plurality of fourth pixel values based at least in part on the plurality of third pixel values (1070). For example, the neural network may learn a set of rules (or neural network model) that can be used to infer a denoised image from a low-light image. In some implementations, the neural network may be trained to perform a pure denoising operation. For example, the neural network may be trained on raw image data so that the resulting neural network model is agnostic to ISP.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of denoising images, comprising:
   receiving a plurality of first pixel values representing an input image having a first brightness level and a first amount of noise;
   receiving a plurality of second pixel values representing a ground truth image having a second brightness level and a second amount of noise that is less than the first amount;
   determining a first range of values associated with the plurality of second pixel values;
   determining a first scaling factor associated with a kth quantile of the first range of values;
   performing a first scaling operation on the plurality of first pixel values that produces a respective plurality of third pixel values based on the first scaling factor;
   performing a second scaling operation on the plurality of second pixel values that produces a respective plurality of fourth pixel values based on the first scaling factor;
   training a neural network to reproduce the plurality of fourth pixel values based at least in part on the plurality of third pixel values;
   receiving a plurality of fifth pixel values representing a first image; and
   inferring a denoised image from the plurality of fifth pixel values based on the neural network.

2. The method of claim 1, wherein each of the plurality of fifth pixel values is associated with a respective color of a color filter array.

3. The method of claim 2, wherein the denoised image comprises a plurality of sixth pixel values each associated with a respective color of the color filter array.

4. The method of claim 1, further comprising:
   determining a black level associated with the first image; and
   subtracting the black level from the plurality of fifth pixel values prior to performing the third scaling operation.

5. The method of claim 1, wherein the first brightness level includes an amount of exposure, gain, or illuminance associated with the plurality of first pixel values and the second brightness level includes an amount of exposure, gain, or illuminance associated with the plurality of second pixel values.

6. The method of claim 1, further comprising:
   determining a third scaling factor representing a ratio of the second brightness level relative to the first brightness level; and
   applying the third scaling factor to each of the plurality of first pixel values prior to performing the first scaling operation.

7. The method of claim 6, wherein the third scaling factor is determined based at least in part on the plurality of first pixel values and the plurality of second pixel values.

8. The method of claim 1, further comprising:
   determining a first black level associated with the input image;
   determining a second black level associated with the ground truth image; and
   subtracting the first black level from the plurality of first pixel values prior to performing the first scaling operation; and
   subtracting the second black level from the plurality of second pixel values prior to performing the second scaling operation.

9. The method of claim 8, wherein the first black level is determined based at least in part on the plurality of first pixel values, the plurality of second pixel values, and the second black level.

10. The method of claim 1, further comprising:
    determining a second range of values associated with the plurality of fifth pixel values; and
    determining a second scaling factor based at least in part on a normalized range of values associated with the neural network, the second scaling factor representing the kth quantile of the second range of values;
    wherein the denoised image is inferred based at least in part on the second range of values and the second scaling factor.

11. The method of claim 10, further comprising:
    performing a third scaling operation on the plurality of fifth pixel values that produces a respective plurality of seventh pixel values based on the second scaling factor;
    wherein the denoised image is inferred based at least in part on the plurality of seventh pixel values.

12. An image processor comprising:
    a processing system; and
    a memory storing instructions that, when executed by the processing system, causes the image processor to:
       receive a plurality of first pixel values representing an input image having a first brightness level and a first amount of noise;
       receive a plurality of second pixel values representing a ground truth image having a second brightness level and a second amount of noise that is less than the first amount;
       determine a first range of values associated with the plurality of second pixel values;
       determine a first scaling factor associated with a kth quantile of the first range of values;
       perform a first scaling operation on the plurality of first pixel values that produces a respective plurality of third pixel values based on the first scaling factor;

perform a second scaling operation on the plurality of second pixel values that produces a respective plurality of fourth pixel values based on the first scaling factor;

training a neural network to reproduce the plurality of fourth pixel values based at least in part on the plurality of third pixel values;

receiving a plurality of fifth pixel values representing a first image; and inferring a denoised image from the plurality of fifth fifth pixel values based on the neural network.

13. The image processor of claim 12, wherein each of the plurality of fifth pixel values is associated with a respective color of a color filter array.

14. The image processor of claim 13, wherein the denoised image comprises a plurality of sixth pixel values each associated with a respective color of the color filter array.

15. The image processor of claim 12, wherein execution of the instructions further causes the image processor to:
determine a black level associated with the first image; and
subtract the black level from the plurality of fifth pixel values prior to performing the third scaling operation.

16. The image processor of claim 12, wherein the first brightness level includes an amount of exposure, gain, or illuminance associated with the plurality of first pixel values and the second brightness level includes an amount of exposure, gain, or illuminance associated with the plurality of second pixel values.

17. The image processor of claim 12, wherein execution of the instructions further causes the image processor to:
determine a first black level associated with the input image;
determine a second black level associated with the ground truth image; and
subtract the first black level from the plurality of first pixel values prior to performing the first scaling operation; and
subtract the second black level from the plurality of second pixel values prior to performing the second scaling operation.

18. The image processor of claim 12, wherein execution of the instructions further causes the image processor to:
determine a second range of values associated with the plurality of fifth pixel values; and
determine a second scaling factor based at least in part on a normalized range of values associated with the neural network, the second scaling factor representing the kth quantile of the second range of values;
wherein the denoised image is inferred based at least in part on the second range of values and the second scaling factor.

19. The image processor of claim 18, wherein execution of the instructions further causes the image processor to:
perform a third scaling operation on the plurality of fifth pixel values that produces a respective plurality of seventh pixel values based on the second scaling factor;
wherein the denoised image is inferred based at least in part on the plurality of seventh pixel values.

20. A non-transitory computer-readable storage medium storing instructions for execution by one or more processors of an image processor, wherein execution of the instructions by the one or more processors causes the image processor to perform operations comprising:
receiving a plurality of first pixel values representing an input image having a first brightness level and a first amount of noise;
receiving a plurality of second pixel values representing a ground truth image having a second brightness level and a second amount of noise that is less than the first amount;
determining a range of values associated with the plurality of second pixel values;
determining a first scaling factor associated with a $k^{th}$ quantile of the range of values;
performing a first scaling operation on the plurality of first pixel values that produces a respective plurality of third pixel values based on the first scaling factor;
performing a second scaling operation on the plurality of second pixel values that produces a respective plurality of fourth pixel values based on the first scaling factor;
training a neural network to reproduce the plurality of fourth pixel values based at least in part on the plurality of third pixel values;
receiving a plurality of fifth pixel values representing a first image; and
inferring a denoised image from the plurality of fifth pixel values based on the trained neural network.

* * * * *